US012202947B2

(12) United States Patent
Meng et al.

(10) Patent No.: US 12,202,947 B2
(45) Date of Patent: Jan. 21, 2025

(54) GERM-REPELLENT PLASTIC, A MANUFACTURING METHOD THEREFOR, AND A GERM-REPELLENT PLASTIC ITEM MADE THEREFROM (71) Applicant: NANO AND ADVANCED MATERIALS INSTITUTE LIMITED, Hong Kong (HK)

(72) Inventors: Wenjun Meng, Hong Kong (HK); Sau Kuen Connie Kwok, Hong Kong (HK); Yueying Chen, Hong Kong (HK); Mingyu Zhang, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 955 days.

(21) Appl. No.: 17/042,239

(22) PCT Filed: Apr. 9, 2018

(86) PCT No.: PCT/CN2018/082329
§ 371 (c)(1),
(2) Date: Sep. 28, 2020

(87) PCT Pub. No.: WO2019/195982
PCT Pub. Date: Oct. 17, 2019

(65) Prior Publication Data
US 2021/0115200 A1    Apr. 22, 2021

(51) Int. Cl.
C08J 3/22 (2006.01)
C08K 5/00 (2006.01)
(Continued)

(52) U.S. Cl.
CPC ............ C08J 3/226 (2013.01); C08K 5/0058 (2013.01); C08K 5/103 (2013.01); C08L 55/02 (2013.01); C08J 2433/02 (2013.01)

(58) Field of Classification Search
CPC .... C08J 3/226; C08J 2323/12; C08J 2433/02; C08K 5/0058; C08K 5/103; C08L 55/02; C08L 23/06; C08L 23/0853
See application file for complete search history.

(56) References Cited

U.S. PATENT DOCUMENTS 3,861,949 A  *  1/1975 Onozuka .................. C07F 7/22
                                                    523/122
4,972,011 A  *  11/1990 Richardson ........... C07F 9/4075
                                                    524/130
(Continued)

FOREIGN PATENT DOCUMENTS

CN         1233981 A     11/1999
CN         1242781 A      1/2000
(Continued)

OTHER PUBLICATIONS

Omnexus—Glass Transition Temperature, pp. 1-15.*
(Continued)

Primary Examiner — Alexander C Kollias
(74) Attorney, Agent, or Firm — Daniel F. Nesbitt; Nesbitt IP LLC (57) ABSTRACT A germ-repellent plastic contains an anti-biofouling compound, and a basic plastic. The anti-biofouling compound is optionally selected from the group of a polyol, a polyether polyol, a polyol derivative, and a combination thereof; or the anti-biofouling compound is selected from the group consisting of a polyether, a poly (ethylene glycol) ether, a polysorbate, and a combination thereof; or the anti-biofouling compound is selected from the group consisting of poly (ethylene glycol) sorbitan monolaurate, poly (ethylene glycol) sorbitan monooleate, poly (ethylene glycol) sorbitol hexaoleate, ceteareth, and a combination thereof. The basic plastic is not a blend of a low-density polyethylene polymer and an ethyl vinyl acetate copolymer, a blend of a polypro- (Continued)

Preparation of test inoculum of bacteria.

pylene polymer and an ethyl vinyl acetate copolymer, a blend of polyolefin elastomer polymers and a polyvinyl chloride polymer. A method for manufacturing such a germ-repellent plastic and a germ-repellent plastic item are also described.

16 Claims, 2 Drawing Sheets

(51) Int. Cl.
*C08K 5/103* (2006.01)
*C08L 55/02* (2006.01)

(56) References Cited

U.S. PATENT DOCUMENTS

| | | | |
|---|---|---|---|
| 6,093,559 | A | 7/2000 | Bookbinder et al. |
| 2005/0008671 | A1 | 1/2005 | Van Antwerp |
| 2009/0155335 | A1 | 6/2009 | O'Shaughnessey et al. |
| 2011/0124772 | A1 | 5/2011 | Wang et al. |
| 2011/0305898 | A1 | 12/2011 | Zhang et al. |
| 2017/0129139 | A1 | 5/2017 | Lau et al. |
| 2018/0208753 | A1* | 7/2018 | Lau .................. B29B 7/88 |

FOREIGN PATENT DOCUMENTS

| | | | |
|---|---|---|---|
| CN | 104847971 | A | 8/2015 |
| CN | 106715568 | A | 5/2017 |
| CN | 107955244 | A | 4/2018 |
| CN | 108342046 | A | 7/2018 |
| EP | 0 524 404 | A1 | 1/1993 |
| JP | S56-22466 | B2 | 5/1981 |
| JP | S60-16461 | B2 | 4/1985 |
| JP | S64-8655 | Y | 2/1989 |
| JP | H08-34882 | A | 2/1996 |
| WO | 2012123357 | A1 | 9/2012 |

OTHER PUBLICATIONS

Sancho-Querol et al., New Binary Blends of Ethylene-co-n-buty] Acrylate (EBA) Copolymer and Low Molecular Weight Rosin Ester Resin with Potential as Pressure Sensitive Adhesives, Oct. 19, 2018, Materials, vol. 11, No. 2037, pp. 1-21.*
First Office Action, dated Mar. 29, 2022 by the China National Intellectual Property Administration, in related Chinese Application No. 201880092175.6 filed Apr. 9, 2018 (10 pages) with CNIPA machine translation (10 pages).
Bannerjee et al., "Antifouling Coatings: Recent Developments in the Design of Surfaces that Prevent Fouling by Proteins, Bacteria, and Marine Organisms", 2011, Adv. Mater. vol. 23, p. 690-718 (29 pages).
International Search Report and Written Opinion dated Jan. 10, 2019, in corresponding Application No. PCT/CN2018/082329 filed Apr. 9, 2018 (9 pages).
International Preliminary Report on Patentability (Chapter I) dated Oct. 13, 2020, in corresponding Application No. PCT/CN2018/082329 filed Apr. 9, 2018 (6 pages).
Second Office Action dated Nov. 15, 2022 in related Chinese Application No. 201880092175.6 filed Apr. 9, 2018 (5 pages) with English translation (3 pages).
Third Office Action dated Oct. 16, 2023 in related Chinese Application No. 201880092175.6 filed Apr. 9, 2018 (4 pages) with English translation (2 pages).

* cited by examiner

FIG 1. Preparation of test inoculum of bacteria.

FIG 2. Bioburden challenge and swab test.

GERM-REPELLENT PLASTIC, A MANUFACTURING METHOD THEREFOR, AND A GERM-REPELLENT PLASTIC ITEM MADE THEREFROM

FIELD OF THE INVENTION

The present invention relates to a plastic, a method for manufacturing a plastic, and a plastic item made therefrom.

BACKGROUND

Various items are often manufactured from plastics due to its durability, ease of manufacture, recyclability, ease of sterilization, etc. Plastics, and especially thermoplastics, are often used for items ranging from consumables to medical devices etc. Many of these plastic items may further require periodic or regular disinfection and/or sterilization via, for example, chemical sterilization, radiation sterilization, heat sterilization, etc.

Plastic items may be manufactured by a variety of methods known in the art such as extrusion, moulding, film blowing, etc. and variations thereof, as desired.

Anti-bacterial and/or anti-microbial plastics exist which contain bacteria-killing and microbe-killing materials either embedded into the plastic, and/or coated thereupon. These plastics seek to kill any bacteria, microbes, etc. that touch the plastic, so as to reduce the chance of infection, transmission, etc. However, it has been found that such anti-bacterial and/or anti-microbial plastics may be difficult to register for use in medical devices, as the regulations concerning anti-bacterial and/or anti-microbial materials varies greatly from country-to-country. Additional concerns relate to how long the anti-bacterial and/or anti-microbial effect will last, leaching of the active materials, e.g. nano silver particles and ions may be harmful and post long term toxicity to humans, etc. Furthermore, there is growing concern about the overuse of antimicrobials which can lead to an increase of resistant and multi-resistant organisms.

There are many patents and publications related to coatings or release of the antimicrobials which make the surface germ-repellent. "Antifouling Coatings: Recent Developments in the Design of Surfaces That Prevent Fouling by Proteins, Bacteria, and Marine Organisms", Bannerjee, et al., Adv. Mater., vol. 23, 690-718 (Wiley, 2011); US 2005/0008671 A1 to Antwerp, published on 13 Jan. 2005; US 2009/0155335 A1 to O'Shaughnessey, et al., published on 18 Jun. 2009 and assigned to Pabst Patent Group LLP; CN 104847971 A assigned to Anhui Meiting Special Electric Cable Materials Co., Ltd., published on 19 Aug. 2015, and CN 1242781 A to Tanahashi, published on 26 Jan. 2000, and assigned to Toray Industries. However, previous technologies may cause problems such as, for example, merely form a coating on the basic plastic, may easily leach out of the basic plastic.

Other technologies graft a polymer on to a plastic, typically on a side-chain, such as, for example, US 2011/0305898 A1 to Zhang, et al., published on 15 Dec. 2011; US 2011/0124772 A1 to Wang, et al., published on 26 May 2011.

Another existing category of plastics is germ-repellent plastics, which typically contain an anti-biofouling compound which may, for example, provide a surface from which bacteria, microbes, etc. easily slide off of. The object of these materials is often to create a surface which reduces the chance of bacterial attachment thereto, which in turn reduces the chances of colony growth, the formation of biofilms, etc. These germ-repellent plastics contain a germ-repellent material that may be, for example, comingled with an intermediate plastic into a masterbatch, and then comingled with the basic plastic. This is a unique built-in germ-repellent feature to plastics. See, for example, US 2017/0129139 A1 to Lau, et all., published on 11 May, 2017, and assigned to Nano and Advanced Materials Institute, Ltd., of Hong Kong. However, this technology may require the identical or substantially identical backbone as the basic plastic, etc.

In addition, the need exists for germ-repellent plastics that may be used with a greater variety of other plastics. Accordingly, the need exists for additional germ-repellent plastics, germ-repellent plastic items made therefrom, and methods of manufacturing such germ-repellent plastic items. The need also exists for germ-repellent plastics where the germ-repellency benefit is stable and/or does not leach out, and a germ-repellent plastic that is not merely a coating on the basic plastic.

SUMMARY OF THE INVENTION

An embodiment of the invention herein relates to a germ-repellent plastic containing an anti-biofouling compound, and a basic plastic. The anti-biofouling compound is optionally selected from the group consisting of a polyol, a polyether polyol, a polyol derivative, and a combination thereof; or wherein the anti-biofouling compound is selected from the group consisting of a polyether, a poly(ethylene glycol) ether, a polysorbate, and a combination thereof; or wherein the anti-biofouling compound is selected from the group consisting of poly(ethylene glycol) sorbitan monolaurate, poly(ethylene glycol) sorbitan monooleate, poly(ethylene glycol) sorbitol hexaoleate, ceteareth, and a combination thereof. The basic plastic is not a blend of a low-density polyethylene polymer and an ethyl vinyl acetate copolymer, a blend of a polypropylene polymer and an ethyl vinyl acetate copolymer, a blend of polyolefin elastomer polymers and a polyvinyl chloride polymer.

An embodiment of the present invention relates to a method for manufacturing a germ-repellent plastic herein, wherein the basic plastic and the anti-biofouling compound are comingled in an extruder.

An embodiment of the present invention relates to a method for manufacturing a germ-repellent plastic having the steps of providing an anti-biofouling compound, providing a basic plastic, and comingling the anti-biofouling compound with the basic plastic. The anti-biofouling compound is optionally selected from the group consisting of a polyol, a polyether polyol, a polyol derivative, and a combination thereof; or wherein the anti-biofouling compound is selected from the group consisting of a polyether, a poly (ethylene glycol) ether, a polysorbate, and a combination thereof; or wherein the anti-biofouling compound is selected from the group consisting of polyethylene glycol sorbitan monolaurate, poly(ethylene glycol) sorbitan monooleate, poly(ethylene glycol) sorbitol hexaoleate, ceteareth, and a combination thereof. The basic plastic is not a blend of a low-density polyethylene polymer and an ethyl vinyl acetate copolymer, a blend of a polypropylene polymer and a ethyl vinyl acetate copolymer, a blend of polyolefin elastomer polymers, or a polyvinyl chloride polymer.

An embodiment of the present invention relates to a germ-repellent plastic item containing the germ-repellent plastic herein, and/or made by the method described herein.

Without intending to be limited by theory, it is believed that the invention herein provides a germ-repellent plastic, germ-repellent plastic item, etc. where the germ-repellency is permanently integrated into the plastic, as opposed to merely coated thereupon. Therefore, the present invention may maintain the germ-repellency benefit for a long time without leaching or otherwise degrading, especially if the basic plastic has a Tg of greater than or equal to 60° C.; or greater than or equal to 65° C.; or greater than or equal to 70° C. It is believed that the physical comingling and therefore integration of the anti-biofouling compound with the basic plastic reduces leaching of the anti-biofouling compound form the germ-repellent plastic. It is also believed that the germ-repellent plastic herein may provide a significant reduction in the adhesion of both gram positive bacteria as well as gram-negative bacteria to the germ-repellent plastic herein, as compared to the basic plastic itself.

It is also believed that the present invention herein allows a germ-repellency benefit to be applied to a greater range of basic plastics, and also may, for example, reduce manufacturing complexity, raw material storage, and the need for special processing steps. This in turn may lead to greater flexibility for designers and/or manufacturers.

DESCRIPTION OF THE PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight of the final product, material, plastic, etc. as appropriate, unless specifically indicated otherwise.

As used herein, the term "comingling" and its other forms such as "comingled", etc. indicates that at least two materials are physically mixed together; or physically mixed together and chemically mixed together; or physically mixed together and chemically bonded together.

As used herein, the term "germ" indicates a microbe; or bacteria

As used herein, the term "germ-repellent" when describing a material (or plastic item, etc.) and its other grammatical forms, such as "germ-repellency", etc. indicate that the material (or plastic item, etc.) reduces the physical adhesion; or the initial physical adhesion, of microbes, bacteria, etc. to the material and/or enhances the likelihood that they become physically dislodged from the plastic material.

An embodiment of the present invention relates to a germ-repellent plastic containing an anti-biofouling compound and a basic plastic. The anti-biofouling compound is optionally selected from the group of a polyol, a polyether polyol, a polyol derivative, and a combination thereof; or wherein the anti-biofouling compound is selected from the group consisting of a polyether, a poly(ethylene glycol) ether, a polysorbate, and a combination thereof; or the anti-biofouling compound is selected from the group consisting of poly(ethylene glycol) sorbitan monolaurate, poly(ethylene glycol) (PEG) sorbitan monooleate, poly(ethylene glycol) (PEG) sorbitol hexaoleate, ceteareth, and a combination thereof. The basic plastic is not a blend of a low-density polyethylene (LDPE) polymer and an ethyl vinyl acetate (EVA) polymer, a blend of a polypropylene (PP) polymer and an EVA polymer, a blend of polyolefin elastomer (POE) polymers, or a polyvinyl chloride (PVC) polymer.

However, it is believed that the present invention is significantly different from previous plastics known in the art, in that the intermediate plastic herein need not be exactly the same base polymer backbone as the basic plastic, but in some embodiments need only contain a single common polymeric segment. Without intending to be limited by theory, it is believed that in some embodiments the intermediate does not need to; or does not, contain the same polymeric segment as the basic plastic.

The anti-biofouling compound herein reduces the chance of adhesion of a germ, such as a microbe or bacteria, to adhere to the basic plastic and/or components made from the basic plastic. Without intending to be limited by theory, it is believed that the anti-biofouling compound may, for example, provide a surface from which a biofouling agent (e.g., bacteria, microbes, etc.) may easily slide off of as described herein. The anti-biofouling compound may, for example, make the plastic surface very hydrophilic so that there is a thin layer of water on the plastic which prevents the biofouling agent from attaching to the plastic.

The anti-biofouling compounds herein are available from a variety of vendors worldwide in various grades.

In an embodiment herein, the polyether polyol or the polyol derivative is a PEG molecule with from about 1 to about 20 $C_{4-28}$ ester moieties attached thereto.

Ceteareth (e.g., Ceteareth-20, CAS No. 68439-49-6) is a polyglycol ether non-ionic surfactant with the structure:

where n indicates the number of ethyl ether repeating units. The ceteareth useful herein has a n from about 2 to about 100; or from about 10 to about 90; or is 20, 40, 60, or 80.

Tween is useful herein, especially Tween 20 and Tween 80. Tween 20 (CAS No. 9005-64-5) is a poly(ethylene glycol) sorbitan monooleate with the structure:

where the sum of $w+x+y+z=20$.

Tween 80 (CAS No. 9005-65-6) is a poly(ethylene glycol) sorbitan monolaurate with the structure:

Sum of w + x + y + z = 20 where the sum of w+x+y+z=20.

Poly(ethylene glycol) sorbitol hexaoleate (e.g., CAS No. 57171-56-9) has the structure:

wherein n is a natural number form about 2 to about 100.

In an embodiment herein, the anti-biofouling compound is from about 0.001% by weight to about 50% by weight; or from about 0.001% by weight to about 20% by weight; or from about 0.01% by weight to about 15% by weight, of the germ-repellent plastic.

The basic plastic herein is not a blend of a LDPE polymer and an EVA polymer, a blend of a PP polymer and an EVA polymer, a blend of POE polymers, or a PVC polymer. In an embodiment herein, the basic plastic is a thermoplastic; or wherein the basic plastic has a glass transition temperature (Tg) of greater than or equal to about 60° C.; or greater than or equal to about 65° C., or greater than or equal to about 70° C.

In an embodiment herein, the basic plastic contains a PP polymer, a high-density poly ethylene (HDPE) polymer, an EVA polymer, and a combination thereof, but, as previously-noted, the basic plastic is not a blend of a LDPE polymer and an EVA polymer, a blend of a PP polymer and an EVA polymer, a blend of POE polymers, or a PVC polymer. These basic plastics are available from vendors around the world in a variety of grades and forms.

In an embodiment herein, the basic plastic makes up from about 50% by weight to about 99.999% by weight; or from about 80% by weight to about 99.999% by weight; or from about 85% by weight to about 99.99% by weight, of the germ-repellent plastic.

In an embodiment herein, the anti-biofouling compound and an intermediate plastic are commingled to form a masterbatch; or the anti-biofouling compound and an intermediate plastic are commingled in an extruder to form a masterbatch; or the anti-biofouling compound and an intermediate plastic are polymerized together to form a masterbatch. Without intending to be limited by theory, it is believed that such a process ensures that the anti-biofouling compound is permanently associated with the basic plastic, which in turn may provide an improved plastic that reduces the chances of the anti-biofouling compound from leaching from the basic plastic, and increases the germ-repellency benefit longevity.

In an embodiment herein, the anti-biofouling compound is comingled with an intermediate plastic to form a masterbatch. The masterbatch is then comingled with the basic plastic to form the germ-repellent plastic. In an embodiment herein, the intermediate plastic is, or contains, a random terpolymer; or the random terpolymer contains a monomer selected from the group of an ethylene monomer, an acrylic ester monomer, a maleic anhydride monomer, and a combination thereof; or a random terpolymer comprising an ethylene monomer, an acrylic ester monomer, and a maleic anhydride monomer; or a random terpolymer comprising a polymer backbone comprising ethylene monomers, acrylic ester monomers, and maleic anhydride monomers. Typically, in a random terpolymer, the order of the monomers is randomly-determined by the actual stoichiometry and reaction kinetics of the particular monomers present at the time of polymerisation.

In an embodiment herein, the intermediate plastic contains at least one polymeric segment that is compatible with the basic plastic. However, it is believed that the present invention is significantly different from previous plastics known in the art, in that the intermediate plastic herein need not be exactly the same base polymer backbone as the basic plastic, but in some embodiments need only contain a single common polymeric segment. Without intending to be limited by theory, it is believed that in some embodiments the intermediate does not need to contain the same polymeric segment as the basic plastic.

In an embodiment herein, the masterbatch may be from about 0.001% by weight to about 50% by weight; or from about 0.001% by weight to about 20% by weight; or from about 0.01% by weight to about 15% by weight, of the germ-repellent plastic.

In an embodiment herein, the basic plastic may be from about 50% by weight to about 99.999% by weight; or from about 80% by weight to about 99.999% by weight; or from about 85% by weight to about 99.99% by weight, of the germ-repellent plastic.

In an embodiment herein, when a masterbatch is present, then the anti-biofouling compound may be from about 0.01% by weight to about 25% by weight; or from about 0.1% by weight to about 20% by weight; or from about 0.5% by weight to about 15% by weight of the masterbatch.

Alternatively, in an embodiment herein, when the basic plastic is a thermoplastic; or is selected from the group of a polyolefin polymer, a thermoplastic elastomer, a polyether polymer, a polyvinyl polymer, a polyester polymer, a polyacetal polymer, a polyamide polymer, a polyurethane polymer, a polyacrylate polymer, a polycarbonate (PC) polymer, a polyimide polymer, a polyphthalate polymer, a polysulfon polymer e, a polythioether polymer, a polyketone polymer, a polystyrene (PS) polymer, a poly (styrene-co-acrylonitrile) (SAN) polymer and a combination thereof; or wherein the basic plastic is selected from the group consisting of a polypropylene (PP) polymer, a polyethylene (PE) polymer, an ethyl vinyl acetate (EVA) copolymer, an acrylonitrile butyl styrene (ABS) copolymer, polyethylene terephthalate (PET) copolymer, and a combination thereof; or a PP polymer, a high-density poly ethylene (HDPE) polymer, an EVA copolymer, a PC polymer, an ABS copolymer, a PET copolymer, and a combination thereof. In an embodiment herein, especially when the basic plastic is selected from a PP polymer, a HDPE polymer, an EVA copolymer, and a combination thereof, the basic plastic and the masterbatch are comingled together at a weight ratio of from about 100:1 to about 1:1; or from about 75:1 to about 25:1; or from about 60:1 to about 30:1; or from about 55:1 to about 35:1. In such a case, the intermediate plastic is compatible with the basic plastic, meaning that the intermediate plastic comingles homogenously with the basic plastic and does not cause any visible discolorations, or physical flaws.

In an embodiment herein, the basic plastic has a glass transition temperature (Tg) of greater than or equal to about 60° C.; or greater than or equal to about 65° C., or greater than or equal to about 70° C.; or the basic plastic is, or contains ABS, PET, PS, SAN, and a combination thereof, and the basic plastic is not a blend of a LDPE polymer and an EVA copolymer, a blend of a PP polymer and an EVA copolymer, a blend of POE polymers, or a PVC polymer. There is substantially no; or no, intermediate plastic. In such a case, the basic plastic and the anti-biofouling compound may be comingled to (directly) form the germ-repellent plastic. It has been surprisingly found that when the anti-biofouling compound according to the present invention is comingled with ABS, PET, PS, SAN, and a combination thereof, then it has surprisingly been found that no intermediate plastic is needed to help bind the anti-biofouling compound with the basic plastic having a Tg of greater than or equal to about 60° C.; or greater than or equal to about 65° C., or greater than or equal to about 70° C.; or is, or contains, ABS, PET, PS, and/or SAN, prior to forming the germ-repellent plastic. This in turn avoids the need for pre-forming a masterbatch, which may increase efficiency and/or production speed. Without intending to be limited by theory, it is believed that this is due to the filament-like nature of the basic plastic which easily entangles the anti-biofouling compound and easily may homogenously-distribute it therein.

In an embodiment herein, the basic plastic; or the germ-repellent plastic, has a Tg greater than or equal to about 60° C.; or greater than or equal to about 65° C., or greater than or equal to about 70° C. Without intending to be limited by theory, it is believed that in any unreacted chemicals, including, but not limited to the anti-biofouling compound, may leach out of the basic plastic; or the germ-repellent plastic, only if the plastic is brought close to its glass transition temperature (Tg) or higher. It is believed that below the Tg, the anti-biofouling compounds are well encased and/or otherwise immobile within the basic plastic; or the germ-repellent plastic. However, when the molecular chains' temperature reaches the Tg, the anti-biofouling compound may begin to move within the basic plastic; or germ-repellent plastic matrix. In short, when the temperature is lower than Tg, the polymer chains are frozen. When the Tg is reached, the polymer structure may begin to at least partially relax, thereby increasing the mobility of lower molecular weight molecules, such as the anti-biofouling compound, through the matrix, which may potentially lead to the anti-biofouling compound leaching out of the basic plastic; or the germ-repellent plastic. Accordingly, it is believed that if the Tg of the basic plastic; or the germ-repellent plastic, is greater than or equal to about 60° C.; or greater than or equal to about 65° C., or greater than or equal to about 70° C., then the chances of the anti-biofouling compound leaking out is significantly reduced upon normal usage and/or storage.

In an embodiment herein, the ABS, PET, and a combination thereof and the anti-biofouling compound are comingled at a weight ratio of from about 100:1 to about 5:1; or from about 75:1 to about 10:1; or from about 50:1 to about 15:1.

An additive may be present in the germ-repellent plastic, basic plastic, the anti-biofouling compound, the intermediate plastic, and/or the masterbatch. The additive may include, for example, a UV protector (e.g., a UV absorber, a UV blocker, a UV reflector, etc.), a pigment, a plasticiser, a filler, an extender, a coating, a stabilizer, a foaming agent, an anti-blocks, a clarifier, an antistatic agent, an impact modifier, a filler, a lubricant, and a combination thereof. The additive may be present at from about 0.0001% to about 10% by weight of the germ-repellent plastic.

Method of Manufacturing:

In an embodiment herein, a method for manufacturing a germ-repellent plastic includes the steps of providing an anti-biofouling compound, providing a basic plastic, and comingling the anti-biofouling compound with the basic plastic.

Typically the comingling step is a physical mixing; or a physical mixing and a chemical mixing; or a simultaneous physical mixing and chemical mixing; or a physical mixing and/or a chemical bonding of at least two different materials, such as the basic plastic and the anti-biofouling compound; the anti-biofouling compound and the intermediate plastic; the masterbatch and the basic plastic; etc. The comingling step may be conducted when the basic plastic, the anti-biofouling compound, the intermediate plastic, the masterbatch, and/or any additive are melted and/or in a liquid state.

In an embodiment of the present invention, when the basic plastic is a thermoplastic; or contains a PP polymer, a HDPE polymer, an EVA polymer, and/or a combination thereof, then the manufacturing method herein may further contain the steps of: providing an intermediate plastic, comingling the anti-biofouling compound with the intermediate plastic to form a masterbatch, and comingling the masterbatch with the basic plastic to form the germ-repellent plastic.

In an embodiment of the present invention, the anti-biofouling compound and the basic plastic; or the anti-biofouling compound, the intermediate plastic and the basic plastic; or the masterbatch and the basic plastic are comingled to form a germ-repellent plastic. The comingling, step herein may occur via a process such as, for example, melting, casting, moulding, injection moulding, vacuum forming, blow moulding, extruding, co-extruding, mixing, and a combination thereof; or extruding, melting, injection moulding, and a combination thereof; or extruding, injection moulding, and a combination thereof. The extruding may occur in a mould, an extruder, or a combination thereof. The extruder may be, for example, a single-screw extruder, a twin-screw extruder, a no-screw extruder, and others known in the art of plastic manufacturing. Without intending to be limited by theory, it is believed that extrusion may ensure adequate mixing of the anti-biofouling compound, intermediate, and/or masterbatch with the basic plastic to form a consistent and relatively homogenous germ-repellent plastic. It is also believed that comingling the anti-biofouling compound and the basic plastic in an extruder allows sufficiently permanent and homogenous comingling such that the anti-biofouling compound will not significantly leach out of the basic plastic during use, storage, etc.

In an embodiment herein when the basic plastic includes ABS, PET, SAN, PS, and a combination thereof, then the anti-biofouling compound may be comingled directly with the basic plastic to form the germ-repellent plastic.

Germ-Repellent Plastic Item:

The germ-repellent plastic herein may be formed into a germ-repellent plastic item. The germ-repellent plastic item may be any item that is normally formed of a plastic; or a thermoplastic, as desired. In an embodiment herein, the germ-repellent plastic item is selected from the group of a germ-repellent surface, a germ-repellent housing, a germ-repellent medical device, germ-repellent kitchenware, germ-repellent houseware, a germ-repellent handle, germ-repellent clothing, a germ-repellent construction material, and a combination thereof; or a germ-repellent surface, a germ-repellent housing, a germ-repellent medical device; germ-repellent kitchenware, germ-repellent houseware, and a combination thereof. The germ-repellent surface herein may be, for example, a countertop, a desk, a wall, a tile, a floor, a film, an elevator button, a handrail, a toilet, a chopping board, a sink, a computer screen, a keyboard, a computer mouse, a plate, a cup, a touchscreen, and a combination thereof. The germ-repellent housing herein may be, for example, a package, a device housing, a light housing, a phone housing, a mobile phone housing, and a combination thereof. The germ-repellent medical device herein may be, for example, an implantable medical device, a protective medical device (e.g., a bed mat, etc.), a catheter, a blood bag, laboratory equipment, a pipette, a pipette tip, a medical tube, a sample plate, a sample container, a sample bottle, a sample bottle lid, a test tube, a medical/biohazard waste container, a microscope, a laboratory sink, a laboratory counter, a microplate reader, a centrifuge, a rocker, a stirring stick, a test tube cap, a syringe, a thermometer, a magnetic stirring stick, a funnel, a beaker, an incubator, a cooler, a humidity cabinet, a transfer pipette, a dropper, a cylinder, a flask, and a combination hereof. The germ-repellent kitchenware useful herein may include, for example, a chopping board, a sink, an eating utensil, a cooking utensil, a knife blade, a kitchen tool, a kitchen film, a sponge, a bin (e.g., a trashcan), a refrigerator, a freezer, and a combination hereof. The germ-repellent houseware useful herein may include, for example, a banister, a door, a doorframe, a countertop, a desk, a wall, a tile, a floor, an elevator button, a handrail, a toilet, a computer screen, a keyboard, a computer mouse, a shelf, a wallpaper, furniture, a chair, a table, a window film, a plant pot, a bathroom mirror film, a bin (e.g., a trashcan), and a combination thereof.

The germ-repellent handle useful herein includes, for example, a knife handle, a door handle, a refrigerator handle, a sink handle, a toilet flushing handle, a bathroom spigot, a window handle, and a combination thereof. The germ-repellent clothing herein may include, for example, footwear (e.g., socks, shoes, etc.), slacks, a skirt, a dress, a shirt, underwear, a scarf, a glove, a gown, a bib, a hat, glasses, a mask, and a combination thereof. The germ-repellent construction material herein may include, for example, a door handle, an industrial film, a plastic cover, a plastic sheet, a plastic barrier film, a plastic construction film, a window film, and a combination thereof.

In an embodiment herein, the plastic item may be an intermediate plastic item which has a form; or an intermediate form, which is then transformed and/or worked into a final plastic item. Accordingly, the plastic item herein may be in, for example, a form selected from the group of a block, a pellet, a monolith, a tube, a filter, a composite, a film, a sheet, a foam, and a combination thereof. Such an intermediate plastic item may then be formed, i.e., by thermoforming, into the plastic item herein.

Test Methods:

Swab Test:

Preparation of Test Inoculum of Bacteria: *E. coli* (ATCC® 8739™) and *S. aureus* (ATCC® 6538P™).

Figure 1:
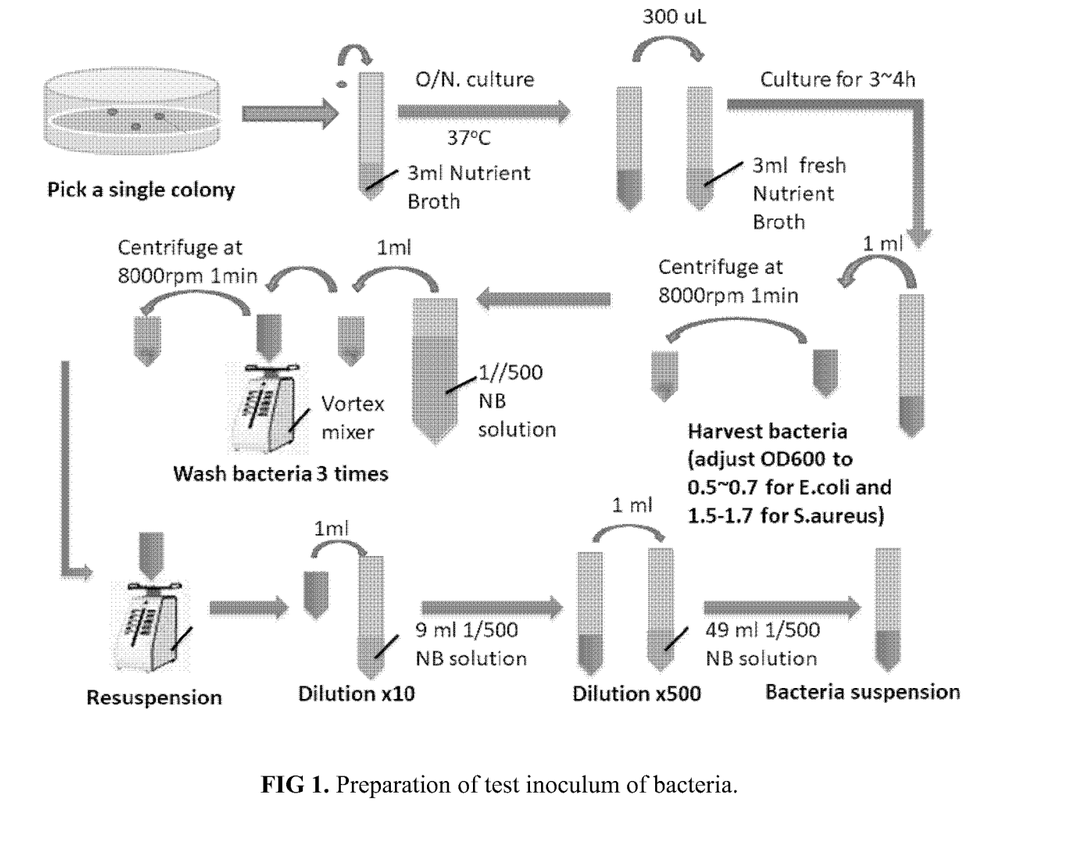
FIG. 1 illustrates a preparation of a bacteria suspension as a test inoculum for the antibacterial activity and efficacy to bacteria on the surface of test samples.

A test inoculum of bacteria is prepared and enumerated upon incubation according to the Japanese Industrial Standard (JIS Z 2801:2000). With slight modifications, this JIS is used to test for the antibacterial activity and efficacy to bacteria on the surface of the test samples. Refer to FIG. 1 illustrating the procedure in a pictorial format with descriptions as below:

1) A single colony of bacteria is picked from an agar plate (preserved in 4° C. fridge) and transferred to 3 mL Nutrient Broth for overnight culture;
2) Transfer 300 μL of the cultured bacteria into 3 mL of fresh Nutrient Broth and culture for approximately 3-4 hours;
3) Harvest the Bacteria (OD600 must be adjusted to 0.6-0.7 for *E. coli*; 1.5-1.7 for *S. aureus*) by centrifuge at 8000 rpm for 1-2 min;
4) Wash the bacteria three times by 0.9% NaCl aqueous solution and centrifugation;
5) Re-suspend the obtained bacteria in 1/500 nutrient broth solution (1/500 NB refers to the 500× diluted Nutrient Broth with pH adjusted to 6.8-7.2) to prepare a bacterial solution as the test inoculum. Multiple dilution depends on the testing samples. Normally, dilute *E. coli* suspension 10× and dilute the *S. aureus* suspension 500×.

Sample Incubation and Swab Test

Figure 2:
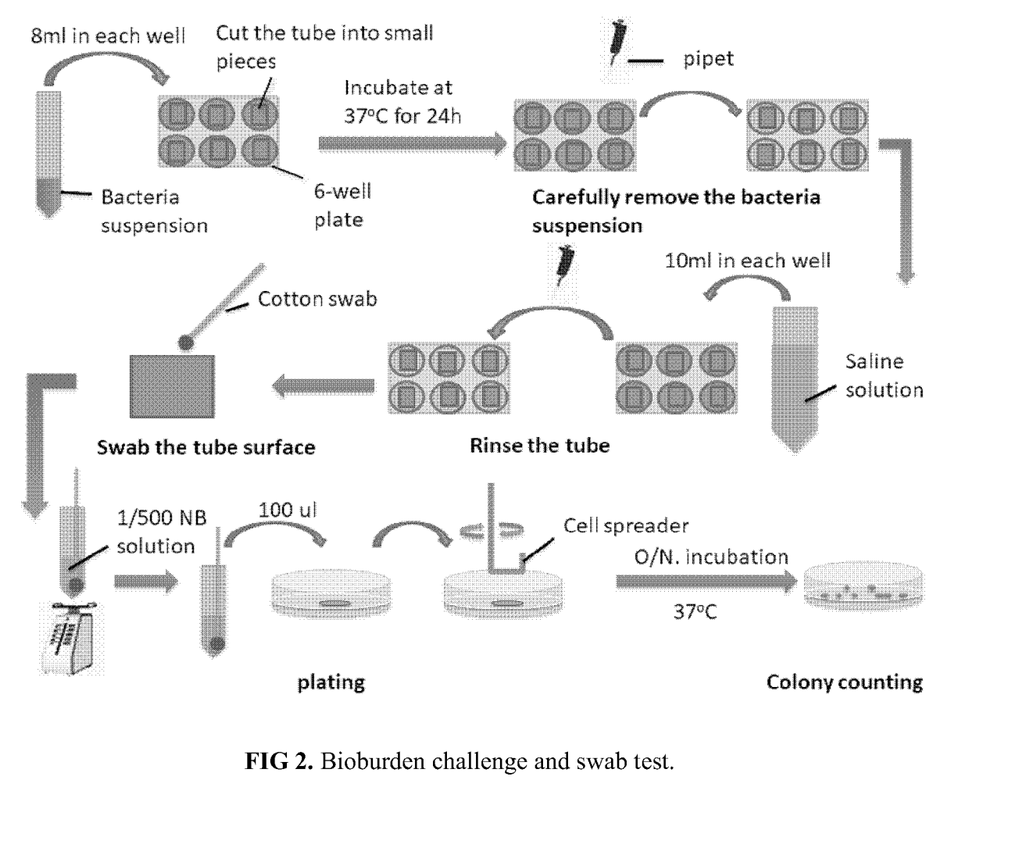
FIG. 2 illustrates a procedure for a bioburden challenge and swab test to examine the bacteria attached on the sample surface.

After inoculation of the sample with the test inoculum (*E. coli* or *S. aureus*) the samples are incubated at 37° C. for 24 hours. A swab test was used to examine the bacteria attached on the sample surface. The experimental procedure is as follows (c.f., FIG. 2):

1) Cut the sample (e.g. tubes) into small pieces and put them into a sterilized 6-well plate.
2) Transfer 8 mL of as-prepared bacterial suspension into each well and incubate at 37° C. for 24 hours.
3) Carefully remove the bacteria suspension.
4) Rinse with 0.9% NaCl aqueous solution and using the same volume to wash for every sample.
5) Use a sterile cotton or 3M quick swab tips applicator to swab the surface of the sample surface and plate either manually using a cell spreader or more consistently with an automated spiral plater (e.g., Eddy Jet 2, IUL, S.A.).
6) After incubation for overnight or up to 24 hours, count the colonies formed on the agar plates.

Without intending to be limited by theory, it is believed that the use of *E. coli* in the above test is representative of the adhesion of other gram-negative bacteria and that the use of *S. aureus* in the above test is representative of other gram-positive bacteria. Accordingly, it is believed that the results of this test are generally representative of other bacteria.

Based on the above test, and as used herein, the germ reduction percentage is calculated as:

$$[\text{average \# cfu on control plastic} - \text{average \# cfu on test plastic}]*100$$

$$[\text{average \# cfu on control plastic}]$$

As used herein the term "cfu" indicates bacterial colony forming units.

In an embodiment herein, the germ-repellent plastic possesses a germ-repellent efficiency of at least about 50%; or at least about 75%; or at least about 85%; or at least about 90%; or at least about 95%. In an embodiment herein, the germ-repellent plastic possesses a germ-repellent efficiency for *E. coli* of from at least about 80%; or at least about 85%; or at least about 90%; or at least about 95%. In an embodiment herein, the germ-repellent plastic possesses a germ-repellent efficiency for *S. aureus* of from at least about 60%; or at least about 70%; or at least about 80%; or at least about 85%.

In an embodiment herein, the germ-repellent plastic is biocompatible according to the ISO 10993 test, the ISO 18562 test, and a combination thereof; or is biocompatible according to the ISO 10993-5 test, the ISO 10993-10 test, and the ISO 18562 test.

Additional tests known in the art may be relevant herein, such as, for example, tensile tests, melt flow index tests, thermo characteristics tests, etc. Specifically ASTM D1238-10 to measure a sample's melt flow index, conducted at 190° C. and with a weight of 2.16 kg may be useful herein. Although some of the examples herein may be tested at other conditions such as, for example, 230° C. and a weight of 5.0 kg, or other conditions, for the purposes of showing infringement and/or being within the scope of this disclosure and or a claim, the ASTM D1238-10 test conditions are specifically 190° C. and with a weight of 2.16 kg.

In an embodiment herein, the germ-repellent plastic is food-contact safe, and/or is otherwise food compatible. Industry-standard, food-contact safe tests include, for example, EU Regulation No. 10/2011, and the U.S. Food and Drug Administration's 21 C.F.R. 177. However, one benefit of the germ-repellent plastic herein, is that for such physical properties measured by such tests, the germ-repellent plastic varies very little from the basic plastic. Accordingly, in an embodiment herein, the germ-repellent plastic has a physical property, and the basic plastic has the same physical property. Examples of the physical property useful herein includes, for example, a melt flow index, a hardness, a mechanical strength, a compression strength, an elongation, a thermal property, and a combination thereof. When the germ-repellent plastic's physical property is measured according to an industry-standard test, and when the basic plastic's same physical property is measured by the same industry-standard test, then the germ-repellent plastic's physical property differs from the basic plastic's same physical property by less than or equal to about ±25%; ±20%; or ±10%; or ±5%.

EXAMPLE 1

100 g of an ethylene/acrylic acid/maleic acid terpolymer intermediate plastic in the presence of 10 g of a ceteareth anti-biofouling compound to form a masterbatch. The basic plastic is a commercially-available PP polymer. The masterbatch is combined with the basic plastic at a weight ratio of 1:45. The masterbatch and the basic plastic are fed into a single-screw extruder having a temperature ranging from 110° C. in the front to 200° C. in the rear to form a germ-repellent plastic (A). The single-screw extruder extrudes the germ-repellent plastic (A) in the form of a sheet.

The weight percentage in the final plastic sheet is therefore: 2% ethylene/acrylic acid/maleic acid terpolymer intermediate plastic, 0.2% ceteareth anti-biofouling compound, and 97.8% PP polymer.

A comparative plastic (Control 1) containing the same PP polymer is also prepared in an identical manner, except that that this comparative sample did not contain any masterbatch, intermediate plastic, or anti-biofouling compound.

A swab test (above) is conducted comparing germ-repellency of the germ-repellent plastic (A) with that of the comparative plastic (Control 1).

EXAMPLE 1, Table 1:

| Sheet Sample with *E. coli* | Replicate 1 | Replicate 2 | Average |
|---|---|---|---|
| comparative plastic (Control 1) | $2.00 \times 10^1$ | $8.00 \times 10^1$ | $5.00 \times 10^1$ |
| germ-repellent plastic (A) | 0 | 0 | 0 |

As can be seen in Table 1, with *E. coli*, the germ-repellent plastic (A) of the present invention provides a greater than 99.9% reduction in the swab test as compared to the comparative plastic (Control 1).

EXAMPLE 1, Table 2:

| Sheet Sample with *S. aureus* | Replicate 1 | Replicate 2 | Average |
|---|---|---|---|
| comparative plastic (Control 1) | $8.99 \times 10^3$ | $9.92 \times 10^3$ | $9.46 \times 10^3$ |
| germ-repellent plastic (A) | $2.8 \times 10^2$ | $1.12 \times 10^2$ | $1.96 \times 10^2$ |

As can be seen in Table 2, with *S. aureus*, the germ-repellent plastic (A) of the present invention provides a 97% reduction in the swab test as compared to the comparative plastic (Control 1). In other words, the germ-repellent plastic (A) only has 3% of the adhesion of the comparative plastic (Control 1).

The Melt Flow Index (MFI) is tested according to ASTM D1238-10 at conditions of 230° C. and 2.16 kg. The MFI of the PP germ-repellent plastic (A) was +15.4% as compared to the unmodified PP (Control 1).

EXAMPLE 2

A germ-repellent plastic (B) and a comparative plastic (Control 2) were prepared as in EXAMPLE 1, except that the basic plastic is HDPE, and the single-screw extruder temperature ranges from 110° C. in the front to 190° C. in the back when preparing the germ-repellent plastic.

A swab test (above) is conducted comparing germ-repellency of the germ-repellent plastic (B) with that of the comparative plastic (Control 2).

EXAMPLE 2, Table 1:

| Sheet Sample with *E. coli* | Replicate 1 | Replicate 2 | Average |
|---|---|---|---|
| comparative plastic (Control 2) | $1.80 \times 10^2$ | $2.20 \times 10^2$ | $2.00 \times 10^2$ |
| germ-repellent plastic (B) | 0 | 0 | 0 |

As can be seen in Table 1, with *E. coli*, the germ-repellent plastic (B) of the present invention provides a >99% reduction in the swab test as compared to the comparative plastic (Control 2).

EXAMPLE 2, Table 2:

| Sheet Sample with S. aureus | Replicate 1 | Replicate 2 | Average |
|---|---|---|---|
| comparative plastic (Control 2) | $2.35 \times 10^4$ | $4.95 \times 10^4$ | $3.65 \times 10^4$ |
| germ-repellent plastic (B) | $3.24 \times 10^3$ | $1.90 \times 10^3$ | $2.57 \times 10^3$ |

As can be seen in Table 2, with *S. aureus*, the germ-repellent plastic (B) of the present invention provides a 92% reduction in the swab test as compared to the comparative plastic (Control 2). In other words, the germ-repellent plastic (B) only has 8% of the adhesion of the comparative plastic (Control 2).

The Melt Flow Index (MFI) is tested according to ASTM D1238-10 at conditions of 190° C. and 2.16 kg. The MFI of the HDPE germ-repellent plastic (B) was +1.4% as compared to the unmodified HDPE (Control 2).

EXAMPLE 3

The masterbatch is prepared according to EXAMPLE 1, except that the basic plastic is EVA to form a germ-repellent plastic (C). The temperature at the front of the single-screw extruder is 110° C. and the temperature at the back is 190° C.

A comparative plastic sample (Control 3) containing only the basic plastic (EVA) is also prepared in an identical manner, except that no masterbatch, intermediate plastic, or anti-biofouling compound is included.

A swab test (above) is conducted comparing germ-repellency of the germ-repellent plastic sample (C) with that of the comparative plastic sample (Control 3).

EXAMPLE 3, Table 1:

| Sheet sample with E. coli | Replicate 1 | Replicate 2 | Average |
|---|---|---|---|
| comparative plastic (Control 3) | $2.00 \times 10^2$ | $1.94 \times 10^2$ | $1.97 \times 10^2$ |
| germ-repellent plastic (C) | 0 | 0 | 0 |

As can be seen in Table 1, with *E. coli*, when formed as a sheet, the germ-repellent plastic (C) of the present invention provides a >99% reduction in the swab test as compared to the comparative plastic (Control 3).

EXAMPLE 3, Table 2:

| Tube sample with S. aureus | Replicate 1 | Replicate 2 | Average |
|---|---|---|---|
| comparative plastic (Control 3) | $1.16 \times 10^5$ | $1.36 \times 10^5$ | $1.26 \times 10^5$ |
| germ-repellent plastic (C) | $2.6 \times 10^3$ | $1.80 \times 10^3$ | $2.20 \times 10^3$ |

As can be seen in Table 2, with *S. aureus*, when formed as a sheet, the germ-repellent plastic (C) of the present invention provides a 98% reduction in the swab test as compared to the comparative plastic (Control 3).

The Melt Flow Index (MFI) is tested according to ASTM D1238-10 at conditions of 190° C. and 2.16 kg. The MFI of the EVA germ-repellent plastic (C) was +11.7% as compared to the unmodified EVA (Control 3).

EXAMPLE 4

100 parts of commercially-available ABS is comingled with 5 parts PEG sorbitol hexaoleate in a twin-screw extruder to form a germ-repellent plastic (D). The twin-screw extruder has a temperature range from 150° C. in the front to 210° C. in the back.

The germ-repellent plastic is then formed into a sheet via hot press moulding at a temperature of 200° C.

A comparative plastic sample (Control 4) containing only ABS is also prepared in an identical manner, except that no masterbatch, intermediate plastic, or anti-biofouling compound is included.

A swab test (above) is conducted comparing germ-repellency of the germ-repellent plastic sample (D) with that of the comparative plastic sample (Control 4).

EXAMPLE 4, Table 1:

| sheet sample with E. coli | Replicate 1 | Replicate 2 | Average |
|---|---|---|---|
| comparative plastic (Control 4) | $9.20 \times 10^2$ | $8.00 \times 10^2$ | $8.60 \times 10^2$ |
| germ-repellent plastic (D) | $2.00 \times 10^1$ | $4.00 \times 10^1$ | $3.00 \times 10^1$ |

As can be seen in Table 1, with *E. coli*, when formed as a sheet, the germ-repellent plastic (D) of the present invention provides a 96% reduction in the swab test as compared to the comparative plastic (Control 4).

EXAMPLE 4, Table 2:

| sheet sample with S. aureus | Replicate 1 | Replicate 2 | Average |
|---|---|---|---|
| comparative plastic (Control 4) | $1.82 \times 10^5$ | $1.72 \times 10^5$ | $1.77 \times 10^5$ |
| germ-repellent plastic (D) | $2.00 \times 10^4$ | $1.40 \times 10^4$ | $1.70 \times 10^4$ |

As can be seen in Table 2, with *S. aureus*, when formed as a sheet, the germ-repellent plastic (D) of the present invention provides a 90% reduction in the swab test as compared to the comparative plastic (Control 4).

The Melt Flow Index (MFI) is tested according to ASTM D1238-10 at conditions of 200° C. and 2.16 kg. The MFI of the ABS germ-repellent plastic (D) was +24.1% as compared to the unmodified ABS (Control 4).

EXAMPLE 5

100 parts of commercially-available PET is comingled with 5 parts PEG sorbitol hexaoleate in a twin-screw extruder to form a germ-repellent plastic (E). The twin-screw extruder has a temperature range from 180° C. in the front to 240° C. in the back.

The germ-repellent plastic is then formed into a sheet via hot press moulding at a temperature of 240° C.

A comparative plastic sample (Control 5) containing only PET is also prepared in an identical manner, except that no masterbatch, intermediate plastic, or anti-biofouling compound is included.

A swab test (above) is conducted comparing germ-repellency of the germ-repellent plastic sample (E) with that of the comparative plastic sample (Control 5).

EXAMPLE 5, Table 1:

| Sheet sample with E. coli | Replicate 1 | Replicate 2 | Average |
|---|---|---|---|
| comparative plastic (Control 5) | $3.60 \times 10^2$ | $4.00 \times 10^2$ | $3.80 \times 10^2$ |
| germ-repellent plastic (D) | $2.02 \times 10^1$ | $2.64 \times 10^1$ | $2.33 \times 10^1$ |

As can be seen in Table 1, with *E. coli*, when formed as a tube, the germ-repellent plastic (E) of the present invention provides a 93% reduction in the swab test as compared to the comparative plastic (5).

EXAMPLE 5, Table 2:

| Sheet sample with S. aureus | Replicate 1 | Replicate 2 | Average |
|---|---|---|---|
| comparative plastic (Control 5) | $1.76 \times 10^5$ | $1.81 \times 10^5$ | $1.79 \times 10^5$ |
| germ-repellent plastic (L) | $6.94 \times 10^4$ | $4.40 \times 10^4$ | $5.67 \times 10^4$ |

As can be seen in Table 2, with *S. aureus*, when formed as a sheet, the germ-repellent plastic (E) of the present invention provides a 68% reduction in the swab test as compared to the comparative plastic (5).

The Melt Flow Index (MFI) is tested according to ASTM D1238-10 at conditions of 265° C. and 5.0 kg. The MFI of the PET germ-repellent plastic (E) was +24.1% as compared to the unmodified PET (Control 5).

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

The publications, references, etc. specifically cited herein are each hereby incorporated by reference in its entirety. However, no admission is made as to their availability and/or relevance as prior art, either alone or in combination.

What is claimed is:

1. A germ-repellent plastic comprising:
   an anti-biofouling compound selected from the group consisting of poly (ethylene glycol) sorbitan monolaurate, poly (ethylene glycol) sorbitan monooleate, poly (ethylene glycol) sorbitol hexaoleate, ceteareth, and a combination thereof; and
   a basic plastic selected from the group consisting of polypropylene (PP), high-density polyethylene (HDPE), ethyl vinyl acetate (EVA), and a combination thereof; and
   an intermediate plastic having a polymer backbone that is different from the basic plastic, the intermediate plastic is comingled with the anti-biofouling compound to form a masterbatch, which is further comingled with the basic plastic to form the germ-repellent plastic, so as to enhance the association between the anti-biofouling compound and the basic plastic, thereby reducing the chances of the anti-biofouling compound leaching from the basic plastic;
   wherein the intermediate plastic is a random terpolymer having a polymer backbone comprising ethylene monomers, acrylic ester monomers, and maleic anhydride monomers.

2. The germ-repellent plastic according to claim 1, wherein the masterbatch comprises from about 0.001% by weight to about 50% by weight of the germ-repellent plastic.

3. The germ-repellent plastic according to claim 1, wherein the intermediate plastic comprises at least one polymeric segment that is compatible with the basic plastic.

4. The germ-repellent plastic according to claim 1, wherein the anti-biofouling compound comprises from about 0.01% by weight to about 25% by weight of the masterbatch.

5. The germ-repellent plastic according to claim 1, wherein the basic plastic comprises from about 50% by weight to about 99.999% by weight of the germ-repellent plastic.

6. A germ-repellent plastic item comprising the germ-repellent plastic according to claim 1.

7. The germ-repellent plastic of claim 1, wherein the intermediate plastic is ethylene/acrylic ester/maleic anhydride terpolymer.

8. The germ-repellent plastic of claim 7, wherein the anti-biofouling compound is ceteareth.

9. The germ-repellent plastic of claim 8, wherein the masterbatch comprises from about 0.001% by weight to about 2.2% by weight of the germ-repellent plastic.

10. The germ-repellent plastic of claim 8, wherein the ethylene/acrylic ester/maleic anhydride terpolymer is about 2% by weight of the germ-repellent plastic.

11. The germ-repellent plastic of claim 8, wherein the ceteareth is about 0.2% by weight of the germ-repellent plastic.

12. The germ-repellent plastic of claim 8, wherein the basic plastic is PP, HDPE, or EVA, and the basic plastic is about 97.8% by weight to about 99.999% by weight of the germ-repellent plastic.

13. A method for manufacturing the germ-repellent plastic, comprising the steps of:
   i) providing an anti-biofouling compound selected from the group consisting of poly (ethylene glycol) sorbitan monolaurate, poly (ethylene glycol) sorbitan monooleate, poly (ethylene glycol) sorbitol hexaoleate, ceteareth, and a combination thereof;
   ii) providing a basic plastic selected from the group consisting of polypropylene (PP), high-density polyethylene (HDPE), ethyl vinyl acetate (EVA), and a combination thereof;
   iii) providing an intermediate plastic consisting of a random terpolymer having a polymer backbone comprising ethylene monomers, acrylic ester monomers, and maleic anhydride monomers, the intermediate plastic having a polymer backbone that is different from the basic plastic;
   iv) comingling the intermediate plastic with the anti-biofouling compound to form a masterbatch and
   iii) comingling the masterbatch with the basic plastic, thereby forming the germ-repellent plastic.

14. The method for manufacturing the germ-repellent plastic according to claim 13 wherein the basic plastic has a Tg greater than or equal to about 60° C.

15. The method for manufacturing the germ-repellent plastic according to claim 13 wherein the comingling step takes place in an extruder, a mould, or a combination thereof.

16. The method for manufacturing the germ-repellent plastic according to claim 15 further comprising the step of thermoforming a plastic item from the germ-repellent plastic.

\* \* \* \* \*